Figure 1:
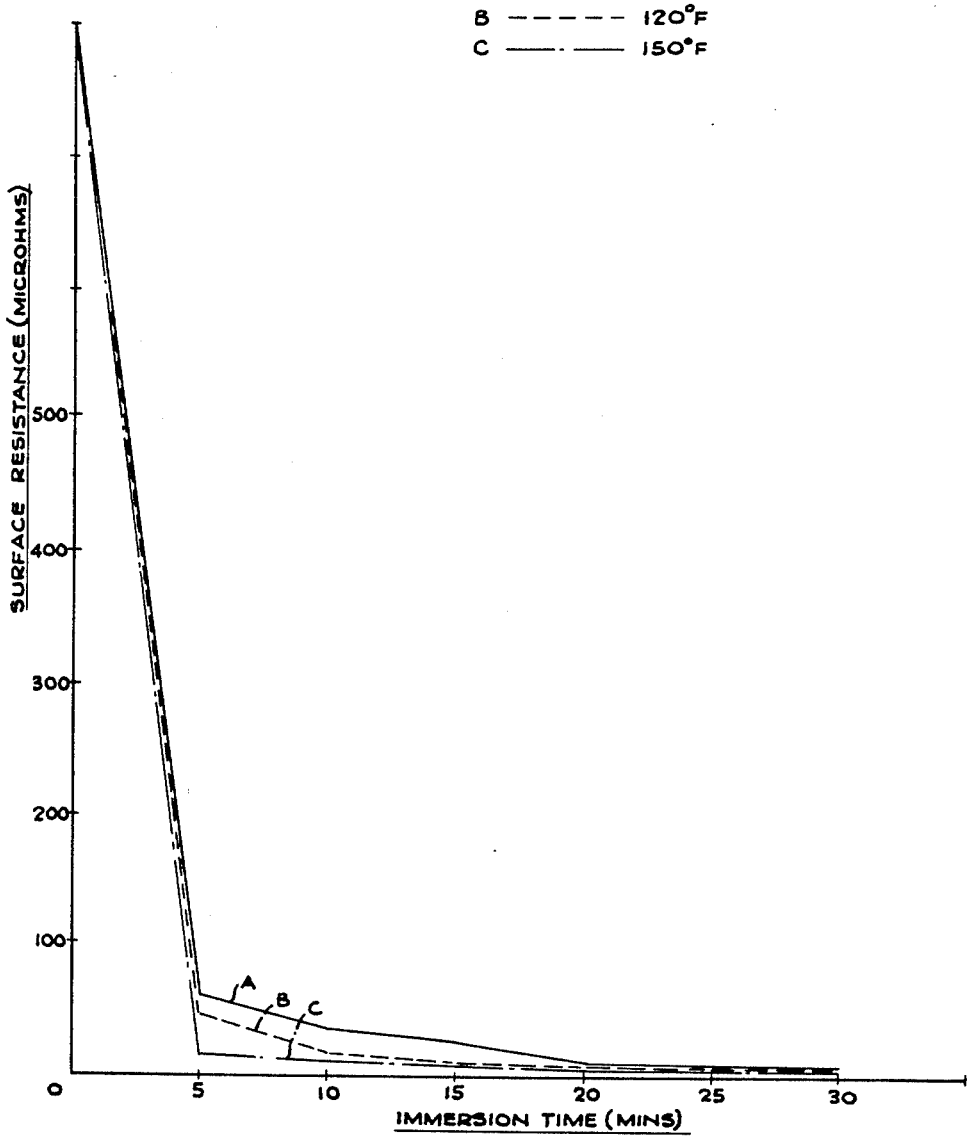

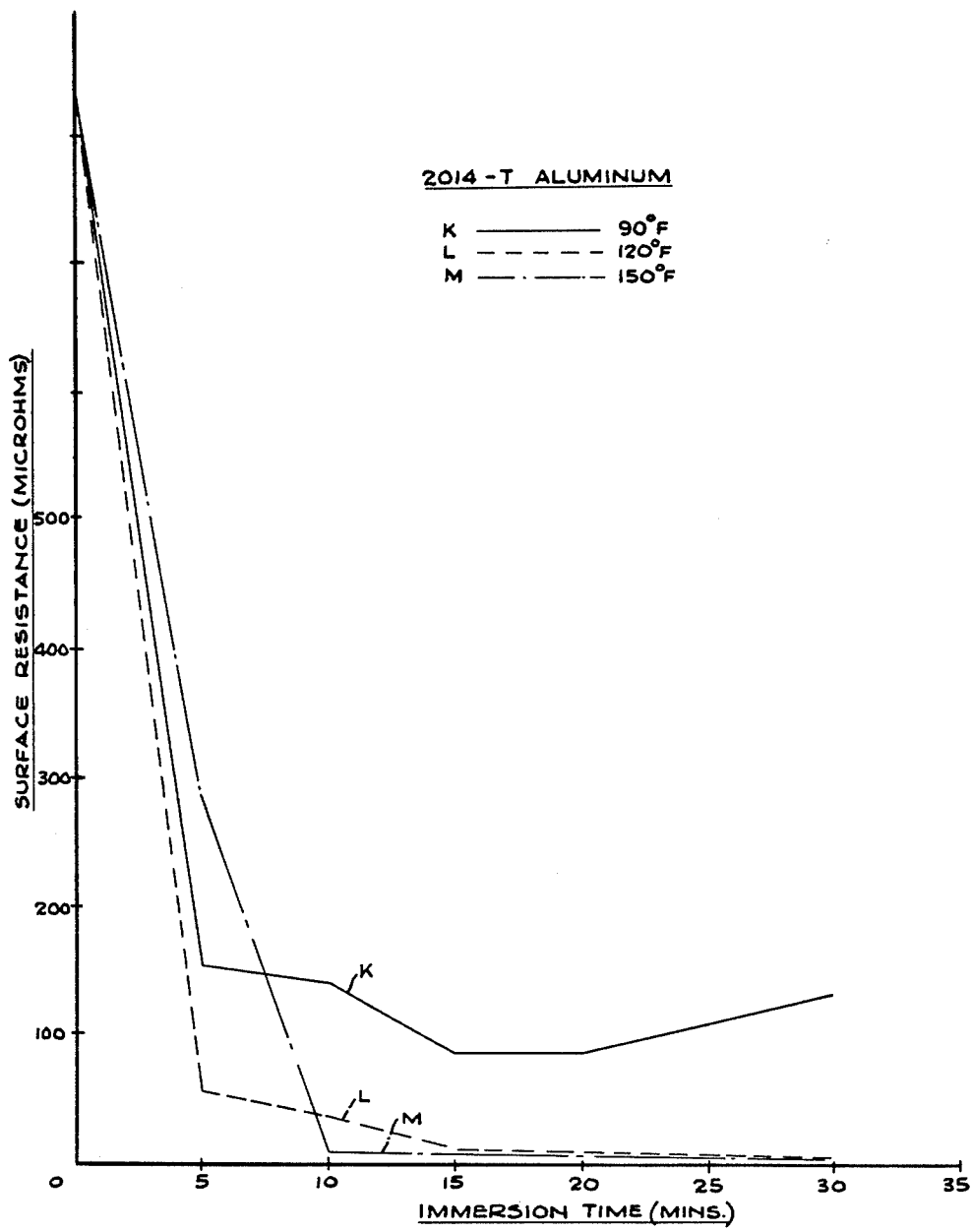

United States Patent Office 3,138,485
Patented June 23, 1964

3,138,485
COMPOSITION AND PROCESS FOR
TREATING ALUMINUM
Frederick S. Kaveggia, West Hollywood, and Robert B. Roessler, Rolling Hills Estates, Calif., assignors to Purex Corporation, Ltd., Lakewood, Calif., a corporation of California
Filed Oct. 19, 1961, Ser. No. 146,234
17 Claims. (Cl. 134—3)

This invention is directed to deoxidizing or removal of oxide film from the surface of objects of aluminum and its alloys, and is particularly concerned with solid compositions, aqueous solutions and procedures for these purposes.

The term "aluminum" employed herein is intended to denote pure aluminum, commercial grade aluminum having small amounts of impurities therein, or aluminum alloys.

As is well known, aluminum surfaces are coated with thin films of aluminum oxide produced by atmospheric oxidation of the aluminum. These aluminum oxide surfaces may or may not be uniformly distributed over the surfaces since the depth and density of the oxide coating depends upon various factors. According to the prior art, various deoxidant compositions and solutions have been developed for reaction with the oxide film to remove it, while attempting to prevent substantial reaction with the base metal under the conditions and at the temperature of treatment. Acidic chromate-type deoxidizers have been developed, but have certain serious disadvantages.

The criteria for the evaluation of any deoxidizer composition for removal of aluminum oxide coatings from aluminum are the tank life of the material, extent of corrosion on the base metal of the treated surfaces, and the obtaining of uniformly low surface resistance readings on the deoxidized surface.

The tank life of the material should of course be as long as possible. However, low corrosion on the treated surfaces is also a necessity, since not only is the appearance of the metal altered by corrosion, but the dissolution of aluminum in the bath results in decreased tank life and efficiency. By reducing the corrosive effect of the ingredients in the bath, the life of the bath is in turn prolonged. One of the most important functions of a good deoxidizer is to obtain low electrical surface resistance, uniformly over the aluminum surface. The obtainment of uniform low electrical surface resistance is essential for spot welding operations, and also to the placing of conversion coatings on the aluminum surface. In the field of spot welding uniform low resistance readings give clean, strong welds obtainable by a minimum of electrical energy, as well as by a minimum of welding tips. The converse is true also; that is, uneven high resistance readings give poor welds, and require the use of many tips and more electrical energy.

The prior art acidic-chromate type deoxidizers generally contain large quantities of alkali metal and ammonium ions. The presence of such large amounts of these ions is believed to have an adverse effect in producing a deoxidized aluminum surface of low surface resistance, particularly on 2014 and 6061 aluminum alloys.

One object of this invention is accordingly to provide improved compositions, aqueous treating solutions and procedures for deoxidizing and/or desmutting surfaces of aluminum.

Another object is the provision of aqueous solutions for the aforementioned purpose, which produce a deoxidized aluminum surface of low electrical surface resistance, rendering such surface particularly suitable for spot welding.

Yet another object is to provide aqueous solutions of the above character, having relatively long tank life, and which permit substantially no corrosion of the base metal surface.

Still another object is to provide aluminum deoxidizing compositions containing a minimum quantity of alkali metal and ammonium ions, and preferably also a minimum amount of iron, and procedure employing such compositions, to provide improved deoxidized surfaces of low electrical resistance.

In the past it has also been generally recognized that the time of treatment in solutions of the conventional chromate-type deoxidizer is highly critical from the standpoint of obtaining a minimum electrical surface resistance. Thus, in prior art baths, the surface resistance of certain types of aluminum and its alloys such as those designated 1100, 3003, 7075, 2014, 2024 and 6061, commences to rapidly increase if the alloy is allowed to remain in the deoxidizing bath in excess of about 10 minutes, indicating continual formation of an oxide coating on the alloy surface after this period of treatment. It is thus a still further object of the invention to avoid the aforementioned problem as to criticality of the treating period, and provide compositions and procedure permitting maintenance of alloys such as those mentioned above in the treatment solutions for prolonged periods without seriously increasing electrical surface resistance on the part.

Also, frequently, aluminum parts which have been deoxidized prior to spot welding or other surface treatment must be stored before welding. This storage period produces an undesirable increase in surface resistance of the part, making it necessary to plan the deoxidizing schedule so that the deoxidation operation takes place just prior to spot welding or other surface treatment, and hence a supply of deoxidized parts cannot be retained in readiness in advance of spot welding. It is thus a further invention object to afford deoxidizing compositions and procedure for producing deoxidized aluminum surfaces which remain inert, that is, the surface resistance of the part remains substantially constant without materially increasing, for a substantial period after removal of the aluminum part from the deoxidizing bath.

The above and other objects of the invention will be apparent from the following description of the invention:

We have now found that a composition which consists essentially of a major portion of a sulfate of the group consisting of aluminum sulfate, magnesium sulfate, vanadyl sulfate and uranyl sulfate, preferably aluminum sulfate, a minor portion of chromic acid, and a small amount of a salt of a complex metal double fluoride, when incorporated in an aqueous solution and acidified to within a certain pH range, hereinafter noted, achieves the aforementioned objects of the invention and produces highly improved results over prior art compositions for deoxidizing the surfaces of aluminum. For best results, certain preferred compositions encompassed within the above noted formulation, such as one consisting essentially of aluminum sulfate, chromic acid, also known as chrominum trioxide ($CrO_3$), and potassium titanium fluoride, and also in certain preferred proportions, as described more fully below, are utilized.

The compositions and process of the invention possess several advantages over the prior art compositions and mode of treatment. Thus the employment of our compositions for deoxidizing aluminum produces treating solutions having increased tank life and decreased corrosiveness on the aluminum base metal. Of particular importance the treatment of aluminum, for example the alloys 1100, 3003, 7075, 2024, and particularly 2014 and 6061, in baths containing our composition, results in a metal surface of uniform low electrical surface resistance, thus rendering our compositions particularly valuable for deoxidizing aluminum preparatory to spot welding thereof. Also, the deoxidized surfaces obtained according to the invention, are clean and free from smut.

Further, the period of treatment in solutions of our compositions is not critical as in the prior art, and most aluminum alloys, including but not limited to 1100, 3003, 7075, 2024, 2014 and 6061 alloys, have an electrical surface resistance which remains below 50 micro ohms even when immersed in the solution for periods up to 16 hours, whereas in the prior art where such alloys remained in the bath in excess of about 10 minutes, the surface resistance commences to increase and continues to increase indefinitely as result of continual reformation of oxide coating. (An electrical surface resistance of 50 micro ohms or less is considered to be good for spot welding operations.) Finally, employing the compositions and treatment of the invention, the low electrical surface resistance of the surface of the aluminum object following treatment and removal of the object from the bath, remains almost constant for a period of days as contrasted to prior art compositions wherein surface resistance commences to increase undesirably as soon as the alloy is removed from the bath. This latter advantage of the invention composition permits storage of deoxidized aluminum parts for a substantial period prior to spot welding, which cannot ordinarily be done employing certain prior art compositions and procedure.

The compositions and mode of treatment of the invention are also applicable for treatment of aluminum and its alloys for removal of smut subsequent to alkali etching of said aluminum and its alloys. The term "smut" is generally considered to denote any extraneous deposit which may be grease, or a film formed on the surface of the aluminum due to deposition thereon of metals such as copper with which the aluminum may be alloyed. Smut is essentially in the form of an adherent dark gray or black film.

In order to obtain best results according to the invention, it has been found that there should be a balance between the sulfate compounds, e.g. aluminum sulfate or magnesium sulfate, the complex fluoride and the hexavalent chromium for efficient removal of the oxide coating from the aluminum, while being substantially non-corrosive on the aluminum base metal. In other words, our composition and the proportions of the ingredients employed therein are such that the solution formed has a high rate of attack on aluminum oxide and a very low rate of attack on aluminum, and hence may be said to be "safe on aluminum."

The aluminum sulfate, magnesium sulfate (the latter hydrated or anhydrous), vanadyl sulfate or uranyl sulfate can be employed separately in the invention composition, or they may be employed in combination, e.g., a mixture of aluminum and magnesium sulfates, each of the above noted sulfates functioning in substantially the same manner in the composition for deoxidizing. However, it is believed that best operating results are realized employing aluminum sulfate. Magnesium sulfate, when present in solid compositions according to the invention, is hygroscopic, and causes some caking of the mixture. Vanadyl sulfate and uranyl sulfate are presently expensive materials and hence are not now commercially practical.

The sulfate compound or compounds of the invention, and the chromic acid (chromium trioxide) component function to remove the surface oxides and smut from the aluminum surface, while inhibiting attack of the bare aluminum surface.

The salt of the complex metal double fluoride is believed to have a catalytic action on the other components of the composition. The complex metal double fluorides of the invention are intended to include those in which the anion is composed of an atom of a metal and fluorine. The alkali metal and ammonium salts of the complex titanium fluoride (fluotitanate), e.g. the potassium or sodium salt, have been found to operate best. However, other alkali metal and ammonium complex metal double fluoride salts can also be employed. Specific examples of the latter are sodium, ammonium and potassium zirconium fluoride, potassium and sodium zirconium pentafluoride, ammonium cadmium fluoride, potassium molybdenum fluoride, potassium zinc fluoride, and the like. It is noted that although the use of such alkali metal and ammonium complex metal double fluoride salts introduce some alkali metal or ammonium ion into the solution, since the amount of such salts employed is small, the amount of alkali metal or ammonium ion present in the deoxidizing compositions of the invention is likewise small and limited, and is preferably not more than about 0.15% by weight of the solution, as compared to the much larger amounts of alkali metal or ammonium ion present in prior art deoxidizers which result from the incorporation therein of large amounts of salts such as sodium bisulfate, which are not employed in the invention compositions.

The small amount of complex metal double fluorides used is usually almost completely soluble in the bath. However, the presence of any small amounts of the insoluble complex metal fluoride which may be present does not adversely affect the functioning of the deoxidizing solution according to the invention.

It has also been found that best results are achieved according to the invention, when the iron content of the solution is maintained at a minimum, and preferably less than about 0.075% by weight of the solution. Such iron may be introduced into the solution as an impurity which may be present in a component of the invention composition, e.g. as an impurity in aluminum sulfate.

Where the content of alkali metal or ammonium ion, and/or the iron content of the deoxidizing solution is materially higher than the maximum amounts above specified, the desired decrease in surface resistance of the aluminum generally is not achieved.

Our deoxidizer composition can be packaged as a mixture in dry form and can be stored for extended periods of time without decomposition, particularly where aluminum sulfate is employed as the sulfate component. Such composition is made up with respect to the relative proportions of ingredients so that a deoxidizer bath can be prepared readily, simply by adding the desired amount of the composition to water.

The composition in preferred form contains by weight about 60% to 90% of the sulfate, e.g. aluminum sulfate or magnesium sulfate (anhydrous basis), about 8% to 40% of chromic acid, and about ½% to 2% of the complex metal double fluoride, e.g. potassium titanium fluoride or potassium zirconium fluoride. While the above noted ranges of proportions are preferred, it is understood that variations in these proportions may be made while still obtaining some improvement over the prior art.

The alkali metal and ammonium content of the dry composition should be maintained preferably at less than about 1% by weight of the composition, in order to form aqueous solutions having a minimum amount of alkali metal or ammonium ion, as noted above. Also, the iron content of the dry composition should be preferably less than about 0.5% by weight of the composition, in order to maintain the iron content of the solutions formed from such composition at a low level as previously pointed out.

The bath for deoxidation of the aluminum objects can be formed either by incorporating the above noted mixtures into the solution or by adding the various ingredients separately to the solution to produce the desired concentrations and relative proportions of the three essential ingredients in the solution. The proportions of the three essential ingredients in the solution are preferably in the range of about 3% to 13% of the sulfate, e.g. aluminum sulfate or magnesium sulfate (anhydrous basis), about 0.3% to 3.0% of chromic acid, and about 0.02 to 0.30% of the complex metal double fluoride, e.g., potassium titanium fluoride or potassium zirconium fluoride, all percentages being based on the weight of the solution. These ranges of proportions and concentrations of the three essential ingredients in the solution may be obtained by incorporating from about 6 to 20 ounces of the dry composition, whose ingredients are within the ranges noted in the next to last paragraph, into water to form one gallon of solution.

The pH of the aqueous solution should be preferably in the range of about 0.5 to about 2.0 in order to obtain the improved results of the invention. In preferred operation for optimum results the pH of the solution should be in the range of about 1.1 to 1.3. Such pH is usually obtained by addition of a small amount of acid, preferably sulfuric acid, to the solution after make-up.

In operation of the bath for deoxidizing, the solution can be maintained at a temperature ranging from room temperature to as high as 150° F. or above, generally in the range of about 90 to 150° F., the optimum temperature of operation being about 120° F. Temperatures substantially above 150° F. are not favored, however, since such high temperatures introduce the danger of possible attack of the aluminum base metal by the solution. The time of treatment for deoxidizing employing the invention composition may range from about 5 to about 30 minutes, usually from about 5 to about 15 minutes, although shorter or longer periods of treatment can be employed.

The aluminum surfaces to be treated in the deoxidizing solutions of the invention should be free from grease and other surface soils. A mild alkaline cleaning bath, preferably inhibited so as to be safe on aluminum, is preferably employed for this purpose. A typical bath of this nature is one which contains substantial proportions of sodium metasilicate and sodium tripolyphosphate. Such mild alkaline cleaners may be used, for example, at a concentration of 6 to 8 ounces per gallon of solution, at temperatures of the order of about 170 to about 195° F.

The following are examples of practice of the invention:

EXAMPLE 1

Four series of 1″ x 6″ panels, one series being composed of 2024–T–3 (clad) aluminum alloy, a second series being composed of 6061–T–4 aluminum alloy, a third series being composed of 7075–T–6 (clad) aluminum alloy, and a fourth series composed of 2014–T (clad) aluminum alloy, were each subjected separately to treatment in the following manner:

The panels of each series were first subjected to treatment in a 6% aqueous solution of an inhibited alkaline cleaner Composition I below, for a period of 15 minutes, at a temperature of 190° F.

Composition I

| | Percent by weight |
|---|---|
| Sodium metasilicate—$Na_2SiO_3$ | 55.7 |
| Sodium tripolyphosphate | 30.0 |
| Crude tall oil | 8.0 |
| Sodium gluconate | 6.0 |
| Antifoam agent | 0.3 |
| | 100.0 |

The panels were then rinsed with cold tap water and then treated in a 12% solution of a deoxidizing composition according to the invention, formed by dissolving Composition II below in water in an amount of 16 ounces per gallon of solution, and adjusting the pH of the solution to 1.2 by addition of 0.5 ounce of concentrated sulfuric acid (66 Baumé) per gallon of solution.

Composition II

| | Percent by weight (approximate) |
|---|---|
| Aluminum sulfate—$Al_2(SO_4)_3$ | 84 |
| Chromic acid—$CrO_3$ | 15 |
| Potassium titanium fluoride—$K_2TiF_6$ | 1 |
| | 100 |

Composition II above was substantially iron-free, that is, it contained less than 0.5% by weight of iron, and the solution formed therefrom as described above, contained less than 0.75% by weight of iron.

When treating the panels in the above Composition II, each of the four series of panels was divided into three groups, one group being treated in the deoxidizing solution at 90° F., the second group in another such solution at 120° F., and the third group in another such solution at 150° F. The panels were treated for a period of 30 minutes in the respective solutions. At various intervals during such treatment, certain of the panels were removed, rinsed with cold tap water, air dried at 190° F., and the surface resistance in micro ohms determined.

The results are indicated in FIGS. 1, 2, 3 and 4 of the accompanying drawing, showing plots of surface resistance in micro ohms against immersion time in the solution in minutes for each of the three groups of panels treated in the deoxidizer at 90° F., 120° F. and 150° F., respectively, for each of the four alloy series of panels.

Referring to FIG. 1, showing results on the 7075 aluminum alloy panels, after 5 minutes of treatment, the surface electrical resistance of the panels treated at 90° F., illustrated by plot A, had reduced to 60 micro ohms, and after 10 minutes had reduced to about 35 micro ohms, and after 20 minutes remained approximately constant at about 10 micro ohms. The 7075 panels treated at 120° F., illustrated by plot B in FIG. 1, were reduced in surface resistance to about 45 micro ohms after 5 minutes, and after 10 minutes were further reduced to about 20 micro ohms, and after 20 minutes' treatment remained constant at somewhat less than 10 micro ohms. The 7075 group of panels treated at 150° F. in the deoxidizer, and illustrated by plot C in FIG. 1, were reduced after 5 minutes of treatment to an electrical surface resistance of about 15 micro ohms, and to a resistance of less than 10 micro ohms after 20 minutes of treatment, and thereafter surface resistance remained constant below 10 micro ohms.

Figure 2:
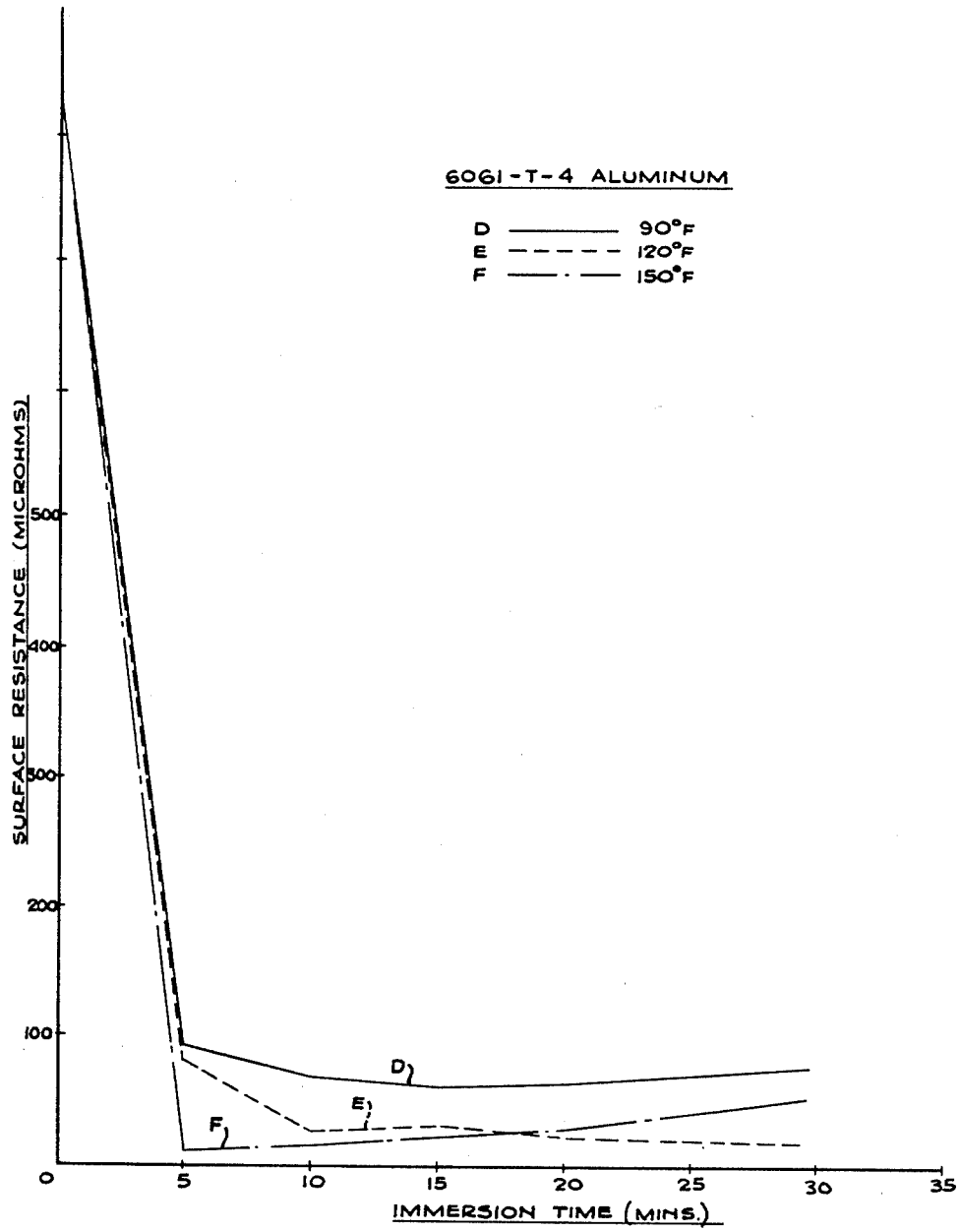

In reference to FIG. 2 of the drawing showing results on the 6061 aluminum panels, after 5 minutes of treatment the first group of such panels treated at 90° F., illustrated by plot D, were reduced in surface resistance to about 90 micro ohms, and after 15 minutes to about 60 micro ohms, and for the next 15 minutes increased somewhat to a surface resistance of about 75 micro ohms after 30 minutes. The second group of 6061 panels treated at 120° F., illustrated by plot E in FIG. 2, were reduced in surface resistance to about 80 micro ohms after 5 minutes of deoxidizing treatment, and reduced to about 25 micro ohms after 10 minutes' treatment, and remaining approximately constant for the next 5 minutes of treatment; after 15 minutes of further treatment, surface resistance of these panels decreased gradually to between 15 and 20 micro ohms at the end of the 30 minute period. As to the third group of 6061 panels, treated at 150° F. and illustrated by plot F in FIG. 2, surface resistance decreased markedly to 10 micro ohms at the end of 5 minutes of treatment, and then appeared to increase gradually during the next 25 minutes of treatment to about 50 micro ohms after 30 minutes of treatment.

Figure 3:
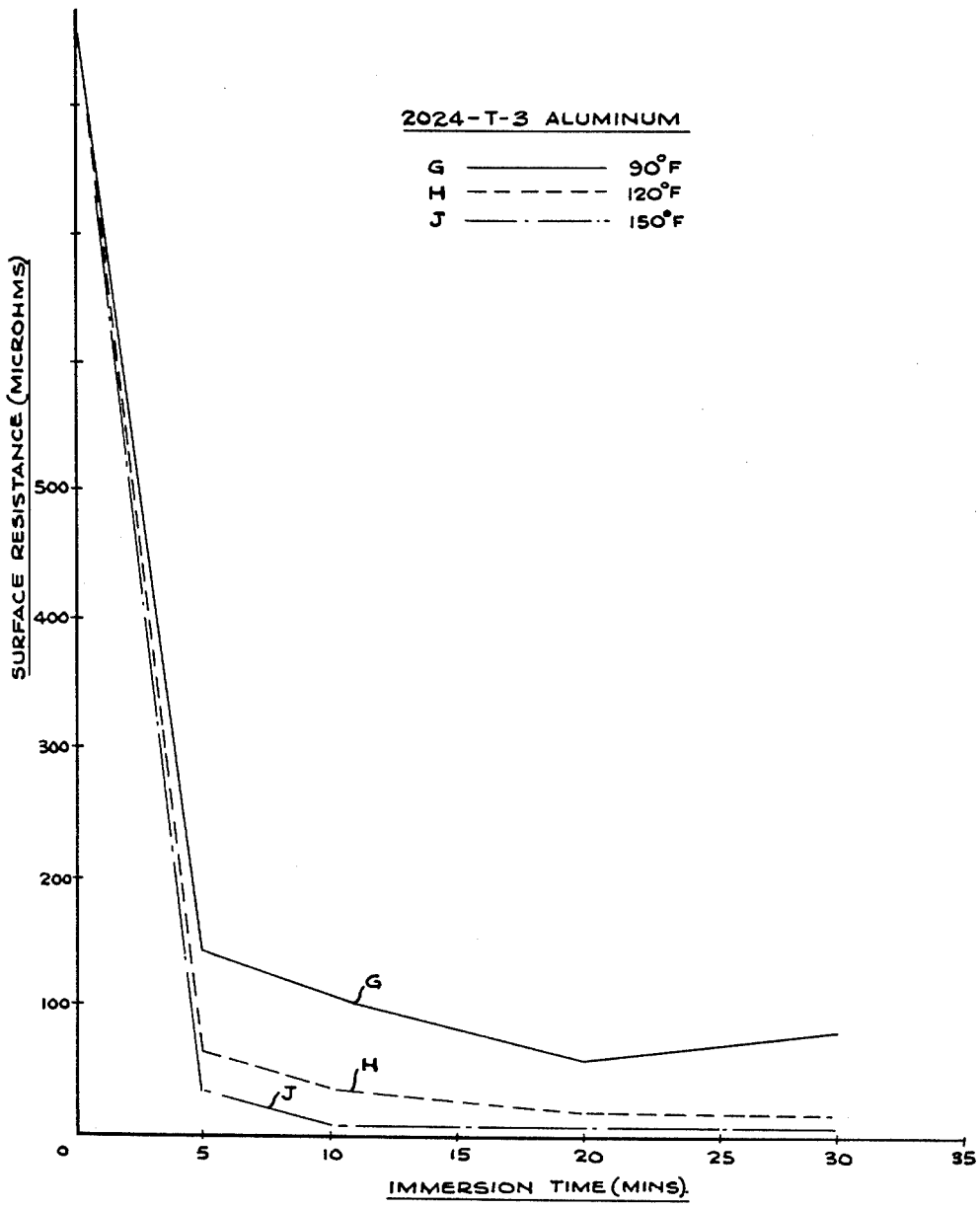

Referring now to FIG. 3 showing results of treatment of the 2024 aluminum panels in the deoxidizer, after 5 minutes of treatment, the surface electrical resistance of the group of panels treated at 90° F., illustrated by plot G, had reduced to 140 micro ohms, and after 20 minutes of treatment to about 55 micro ohms; thereafter, surface resistance increased gradually to about 75 micro ohms at the end of 30 minutes of treatment. The second group of 2024 panels treated at 120° F., and illustrated by plot H in FIG. 3, had reduced surface resistance of about 60 micro ohms at the end of 5 minutes of treatment; after 10 minutes of treatment such resistance had reduced further to about 30 micro ohms, and after 20 minutes to 20 micro ohms. For the next 10 minutes surface resistance decreased slightly. The third group of 2024 panels treated at 150° F., and illustrated by plot J in FIG. 3, had reduced surface resistance of about 30 micro ohms at the end of 5 minutes of treatment, and after 10 minutes had reduced further to 10 micro ohms resistance. For the next 20 minutes of treatment, surface resistance remained constant at about 10 micro ohms for this group of panels.

Finally, referring to FIG. 4, showing results on the 2014 aluminum alloy panels, surface electrical resistance of the panels treated at 90° F., illustrated by curve K, reached a minimum of about 80 micro ohms after 15 to 20 minutes of treatment. However, the 2014 panels treated at 120° F., represented by plot L, reached a reduced surface resistance of about 50 micro ohms in 5 minutes of treatment, and attained a resistance of only about 10 micro ohms in 15 minutes of treatment, after which surface resistance gradually decreased still further for the next 15 minutes of treatment. For the third group of 2014 aluminum panels treated at 150° F., represented by plot M, surface electrical resistance was reduced to about 10 micro ohms after 10 minutes of treatment, and such resistance continued to be reduced slightly over the next 20 minutes of treatment.

From FIGS. 1, 2, 3 and 4 above, it is seen that best results in terms of achieving low electrical surface resistance preferably below 50 micro ohms is achieved by treatment at relatively elevated temperatures of the order of 120 to 150° F., although, for example, as shown by plot A of FIG. 1, illustrating treatment of 7075 aluminum panels at 90° F., surface resistance below 50 micro ohms was achieved after about 7 minutes of treatment in the deoxidizer, and surface resistance of about 10 micro ohms achieved after 20 minutes of treatment. Further, it is seen from the plots in the drawing, that in many instances low electrical resistance below 50 micro ohms can be achieved in as short a period as 5 minutes or less. See for example plots B, C, F and J. Note that after only 5 minutes the 7075 panels treated at 150° F. (plot C of FIG. 1) and the 6061 panels treated at 150° F. (plot F of FIG. 2) had extremely low surface resistance of the order of about 10 to 15 micro ohms. Also it will be observed that the 6061 and 2014 panels, heretofore difficult to deoxidize to low electrical surface resistance of below 50 micro ohms by prior art deoxidizers containing high alkali metal content, were reduced to below 50 micro ohms resistance in from 5 to 10 minutes of treatment at temperatures of 120 and 150° F., in the invention deoxidizer, as seen from plots E, F, L and M in FIGS. 2 and 4.

EXAMPLE 2

Deoxidized aluminum surfaces of low electrical resistance according to the invention are obtainable employing deoxidizing baths prepared by dissolving in water any one of Compositions III to VII below, at a concentration of about 12 to 16 ounces per gallon of solution, adjusting the pH to between about 1.1 and 1.3, and operating such solutions at a temperature between 120 and 150° F., with a period of immersion of the aluminum parts of about 5 to 15 minutes.

*Composition III*

| | Percent by weight |
|---|---|
| Aluminum sulfate | 79 |
| Chromic acid | 20 |
| Potassium titanium fluoride | 1 |
| | 100 |

*Composition IV*

| | |
|---|---|
| Aluminum sulfate | 70.5 |
| Chromic acid | 29.0 |
| Sodium zirconium fluoride | 0.5 |
| | 100.0 |

*Composition V*

| | |
|---|---|
| Magnesium sulfate (anhydrous basis) | 84 |
| Chromic acid | 15 |
| Potassium titanium fluoride | 1 |
| | 100 |

*Composition VI*

| | |
|---|---|
| Vanadyl sulfate | 84 |
| Chromic acid | 15 |
| Potassium titanium fluoride | 1 |
| | 100 |

*Composition VII*

| | |
|---|---|
| Uranyl sulfate (anhydrous basis) | 84 |
| Chromic acid | 15 |
| Potassium titanium fluoride | 1 |
| | 100 |

The electrical surface resistance in the above examples was measured between two surfaces of aluminum processed in the same operation by using a laboratory-made clamping device in conjunction with a conventional micro ohmmeter and a 6 volt battery as source of direct current. This clamping device was used to clamp two sheets or sample plates of aluminum together between a fixed anvil and a movable anvil at a pressure of 40 pounds per square inch. The laboratory device included a pair of sharpened stainless steel spring electrodes spaced adjacent to each of the anvils and actuated therewith to penetrate the surface film of one side of each of the sheets of aluminum being used. The resistance of the film between the plates was measured in micro ohms. On each sheet tested, at least 3 points were checked and results reported on an average of at least 3 tests.

It was also observed that the deoxidizing solutions formed from Compositions II to VII above were practically non-corrosive on the base metal of the aluminum panels tested. Also, the solutions formed from such compositions have an extended tank life.

From the foregoing it is seen that the invention provides a novel deoxidizing composition and deoxidizing process having several important advantages, including the production of deoxidized aluminum parts of low electrical resistance which can be maintained for substantial periods, to thus render the composition and process especially suitable for deoxidizing aluminum prior to spot welding operations. Use of the invention deoxidizer compositions also avoids criticality of time of treatment of the parts in the deoxidizing bath, and permits storage of deoxidized parts prior to use, e.g. in welding operations, for application of a conversion coating, or other purpose. Finally, the invention compositions have reduced corrosion effect on the aluminum base metal and increased tank life.

While we have described particular embodiments of our invention for the purpose of illustration, it should be understood that various modifications and adaptations thereof may be made within the spirit of the invention as set forth in the appended claims.

We claim:

1. A composition which consists essentially of about 60 to about 90% of a sulfate of the group consisting of aluminum sulfate, magnesium sulfate, vanadyl sulfate and uranyl sulfate, about 8 to about 40% of chromic acid and about ½ to about 2% of a fluoride of the group consisting of alkali metal and ammonium titanium fluorides and zirconium fluorides.

2. A composition which consists essentially of about 60 to about 90% of aluminum sulfate, about 8 to about 40% of chromic acid and about ½ to about 2% of an alkali metal zirconium fluoride.

3. A composition of matter which consists essentially of about 84% aluminum sulfate, about 15% chromic acid, and about 1% potassium titanium fluoride, by weight of said composition.

4. An aqueous solution for treating surfaces of aluminum, which consists essentially of about 3 to about 13% of a sulfate of the group consisting of aluminum sulfate, magnesium sulfate, vanadyl sulfate and uranyl sulfate, about 0.3 to about 3.0% chromic acid, and about 0.02 to about 0.30% of a salt of a complex metal double fluoride, by weight of said solution, the remainder of said solution being substantially water.

5. An aqueous solution for treating surfaces of aluminum, which consists essentially of about 3 to about 13% of aluminum sulfate, about 0.3 to about 3.0% chromic acid, and about 0.02 to about 0.30% of a fluoride of the group consisting of alkali metal and ammonium titanium fluorides and zirconium fluorides, by weight of said solution, the remainder of said solution being substantially water.

6. An aqueous solution for treating surfaces of aluminum, which consists essentially of a water solution of the composition of claim 3, in a concentration of about 16 ounces per gallon of solution, adjusted to a pH of about 1.1 to about 1.3 by incorporation of a small amount of sulfuric acid, the remainder of said solution being substantially water.

7. A method of deoxidizing an object of aluminum for removal of aluminum oxide from said object substantially without removal of base metal from said object, which comprises treating said object with an aqueous acidic solution, said solution having a pH in the range of about 0.5 to about 2, and consisting essentially of about 3 to about 13% of a sulfate of the group consisting of aluminum sulfate, magnesium sulfate, vanadyl sulfate and uranyl sulfate, about 0.3 to about 3.0% chromic acid, and about 0.02 to about 0.30% of a salt of a complex metal double fluoride, by weight of said solution, the remainder of said solution being substantially water.

8. A method of deoxidizing an object of aluminum for removal of aluminum oxide from said object substantially without removal of base metal from said object, which comprises treating said object with an aqueous acidic solution, said solution having a pH in the range of about 0.5 to about 2, and consisting essentially of about 3 to about 13% of aluminum sulfate, about 0.3 to about 3.0% chromic acid, and about 0.02 to about 0.30% of a fluoride of the group consisting of alkali metal and ammonium titanium fluorides and zirconium fluorides, by weight of said solution, the remainder of said solution being substantially water.

9. A method of deoxidizing an object of aluminum for removal of aluminum oxide from said object substantially without removal of base metal from said object, which comprises treating said object with an aqueous acidic solution, and maintained at a temperature ranging from about 90 to about 150° F., said solution consisting essentially of a composition of about 84% of aluminum sulfate, about 15% chromic acid, and about 1% potassium titanium fluoride, by weight, in water in a concentration of about 16 ounces of said composition per gallon of solution, adjusted to a pH of about 1.1 to about 1.3 by incorporation of a small amount of sulfuric acid, the remainder of said solution being substantially water.

10. A composition consisting essentially of about 60 to about 90% of a sulfate of the group consisting of aluminum sulfate, magnesium sulfate, vanadyl sulfate and uranyl sulfate, about 8 to about 40% of chromic acid, and about ½ to about 2% of a salt of a complex metal double fluoride, said composition having an alkali metal and ammonium content of less than about 1%, and also containing less than about 0.5% of iron, by weight of said composition.

11. A composition consisting essentially of about 60 to about 90% of aluminum sulfate, about 8 to about 40% of chromic acid, and about ½ to about 2% of a fluoride of the group consisting of alkali metal and ammonium titanium fluorides and zirconium fluorides, said composition having an alkali metal and ammonium content of less than about 1%, and also containing less than about 0.5% of iron, by weight of said composition.

12. A composition consisting essentially of about 60 to about 90% of aluminum sulfate, about 8 to about 40% of chromic acid, and about ½ to about 2% of potassium titanium fluoride, said composition having an alkali metal and ammonium content of less than about 1%, and also containing less than about 0.5% of iron, by weight of said composition.

13. An aqueous solution for treating surfaces of aluminum, which consists essentially of about 3 to about 13% of a sulfate of the group consisting of aluminum sulfate, magnesium sulfate, vanadyl sulfate and uranyl sulfate, about 0.3 to about 3.0% chromic acid, and about 0.02 to about 0.30% of a salt of a complex metal double fluoride, said solution containing not more than about 0.15% of alkali metal and ammonium ion, and also containing less than about 0.075% of iron, by weight of said solution, the remainder of said solution being substantially water.

14. A method of deoxidizing an object of aluminum for removal of aluminum oxide from said object substantially without removal of base metal from said object, which comprises treating said object with an aqueous acidic solution, said solution having a pH in the range of about 0.5 to about 2, and consisting essentially of about 3 to about 13% of a sulfate of the group consisting of aluminum sulfate, magnesium sulfate, vanadyl sulfate and uranyl sulfate, about 0.3 to about 3.0% chromic acid, and about 0.02 to about 0.30% of a salt of a complex metal double fluoride, said solution containing not more than about 0.15% of alkali metal and ammonium ion, and also containing less than about 0.75% of iron, by weight of said solution, the remainder of said solution being substantially water.

15. A composition which consists essentially of about 60 to about 90% of a sulfate of the group consisting of aluminum sulfate, magnesium sulfate, vanadyl sulfate and uranyl sulfate, about 8 to about 40% of chromic acid and about ½ to about 2% of a salt of a complex metal double fluoride.

16. A composition which consists essentially of about 60 to about 90% of aluminum sulfate, about 8 to about 40% of chromic acid, and about ½ to about 2% of a fluoride of the group consisting of alkali metal and ammonium titanium fluorides and zirconium fluorides.

17. A composition which consists essentially of about 60 to about 90% of aluminum sulfate, about 8 to about 40% of chromic acid and about ½ to about 2% of an alkali metal titanium fluoride.

References Cited in the file of this patent

UNITED STATES PATENTS

| | | |
|---|---|---|
| 1,992,205 | Gann et al. | Feb. 26, 1935 |
| 2,762,694 | Newman | Sept. 11, 1956 |
| 3,018,211 | Duke | Jan. 23, 1962 |